United States Patent
Belyaev et al.

(10) Patent No.: US 8,279,935 B2
(45) Date of Patent: Oct. 2, 2012

(54) METHOD AND APPARATUS FOR IMAGE QUALITY CONTROL IN VIDEO DATA

(75) Inventors: Eugeniy Belyaev, Saint-Petersburg (RU); Andrey Turlikov, Saint-Petersburg (RU)

(73) Assignee: Intel Corporation, Santa Clara, CA (US)

( * ) Notice: Subject to any disclaimer, the term of this patent is extended or adjusted under 35 U.S.C. 154(b) by 1154 days.

(21) Appl. No.: 11/904,389

(22) Filed: Sep. 27, 2007

(65) Prior Publication Data

US 2009/0086813 A1    Apr. 2, 2009

(51) Int. Cl.
*H04N 7/12* (2006.01)
(52) U.S. Cl. ............... 375/240.24; 348/14.12
(58) Field of Classification Search ............ 375/240.24, 375/240.29; 348/14.12
See application file for complete search history.

(56) References Cited

U.S. PATENT DOCUMENTS

| | | | | |
|---|---|---|---|---|
| 6,075,819 | A * | 6/2000 | Saw | 375/240 |
| 7,106,799 | B1 * | 9/2006 | Sostawa et al. | 375/240.24 |
| 7,389,318 | B2 * | 6/2008 | Yoshida et al. | 709/200 |
| 2006/0062292 | A1 * | 3/2006 | Boice et al. | 375/240.01 |
| 2007/0104272 | A1 * | 5/2007 | He et al. | 375/240.12 |
| 2007/0116116 | A1 * | 5/2007 | Sostawa et al. | 375/240.03 |
| 2007/0171969 | A1 * | 7/2007 | Han et al. | 375/240.1 |
| 2007/0172211 | A1 * | 7/2007 | Panda et al. | 386/112 |
| 2008/0159639 | A1 * | 7/2008 | Dvir et al. | 382/236 |
| 2008/0232459 | A1 * | 9/2008 | Auyeung | 375/240.01 |

OTHER PUBLICATIONS

Chi-Yuan Hsu, et al., "Rate Control for Robust Video Transmission Over Burst-Error Wireless Channels," May 1999, pp. 756-773.
Frederick Jelinek, "Buffer Overflow in Variable Length Coding of Fixed Rate Sources," Dec. 1967, pp. 490-501.

* cited by examiner

*Primary Examiner* — Gary Mui
(74) *Attorney, Agent, or Firm* — Trop, Pruner & Hu, P.C.

(57) ABSTRACT

In one embodiment of the invention, a method for controlling video image quality may include receiving digital video data into a buffer that is coupled to a video data encoder. The video data includes multiple tiles. One of the tiles is compressed at a first compression bit size and another tile is compressed at a second compression bit size. The tiles are transmitted to a video data decoder. The first compression bit size is unequal to the second compression bit size.

20 Claims, 3 Drawing Sheets

METHOD AND APPARATUS FOR IMAGE QUALITY CONTROL IN VIDEO DATA

BACKGROUND

Transmission of real-time video over wired or wireless channels is becoming increasingly popular. While a transmission system should ideally provide maximum visual quality for the video, it may be difficult to do so with channels that have limited transfer rates and transmitters/receivers/transceivers that have limited memory size. Image and video coding standards, such as ITU-T and ISO/IEC JTC 1, JPEG 2000 Image Coding System: Core Coding System, ITU-T Recommendation T.800 and ISO/IEC 15444-1 (JPEG 2000 Part 1), 2000, and related standards (see, e.g., www.ece.uvic.ca/~mdadams/jasper/), may provide transfer rate control with a high accuracy level. However, such standards have limitations. For example, pictures may need to be split into small fragments, such as tiles. Each tile must then be compressed separately due to, for example, memory restrictions. The standards may assign an equal bit-size (i.e., number of bits) for each compressed tile. However, the visual quality (e.g., peak signal-to-noise ratio (PSNR)) of decoded tiles may differ significantly. Thus, some decoded tiles may have "good" visual quality while others have "bad" visual quality.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
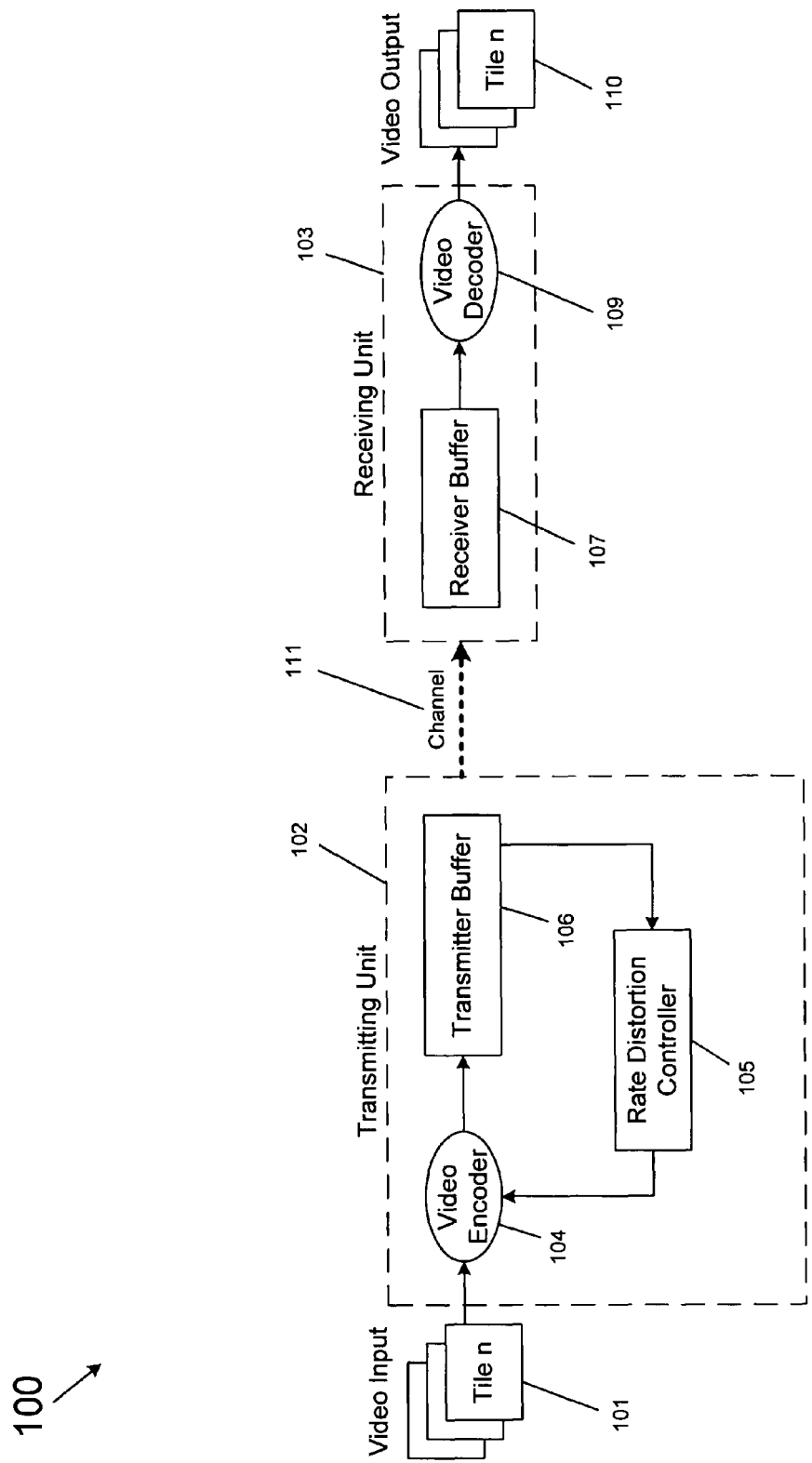
FIG. 1 is a block diagram of one embodiment of the invention.

FIG. 1 is a block diagram of one embodiment 100 of the invention. One or more data tiles (e.g., video) 101 may be input into transmitting unit 102. Video encoder 104 may couple to a rate distortion controller 105 and transmission buffer 106 via a feedback loop. Compressed data may be transmitted to a receiving unit 103 via a wired or wireless transmission channel 111. The compressed data may be decompressed using video decoder 109, which is coupled to receiver buffer 107. Uncompressed tiles 110 may be produced from the receiving unit 103.

Figure 2:
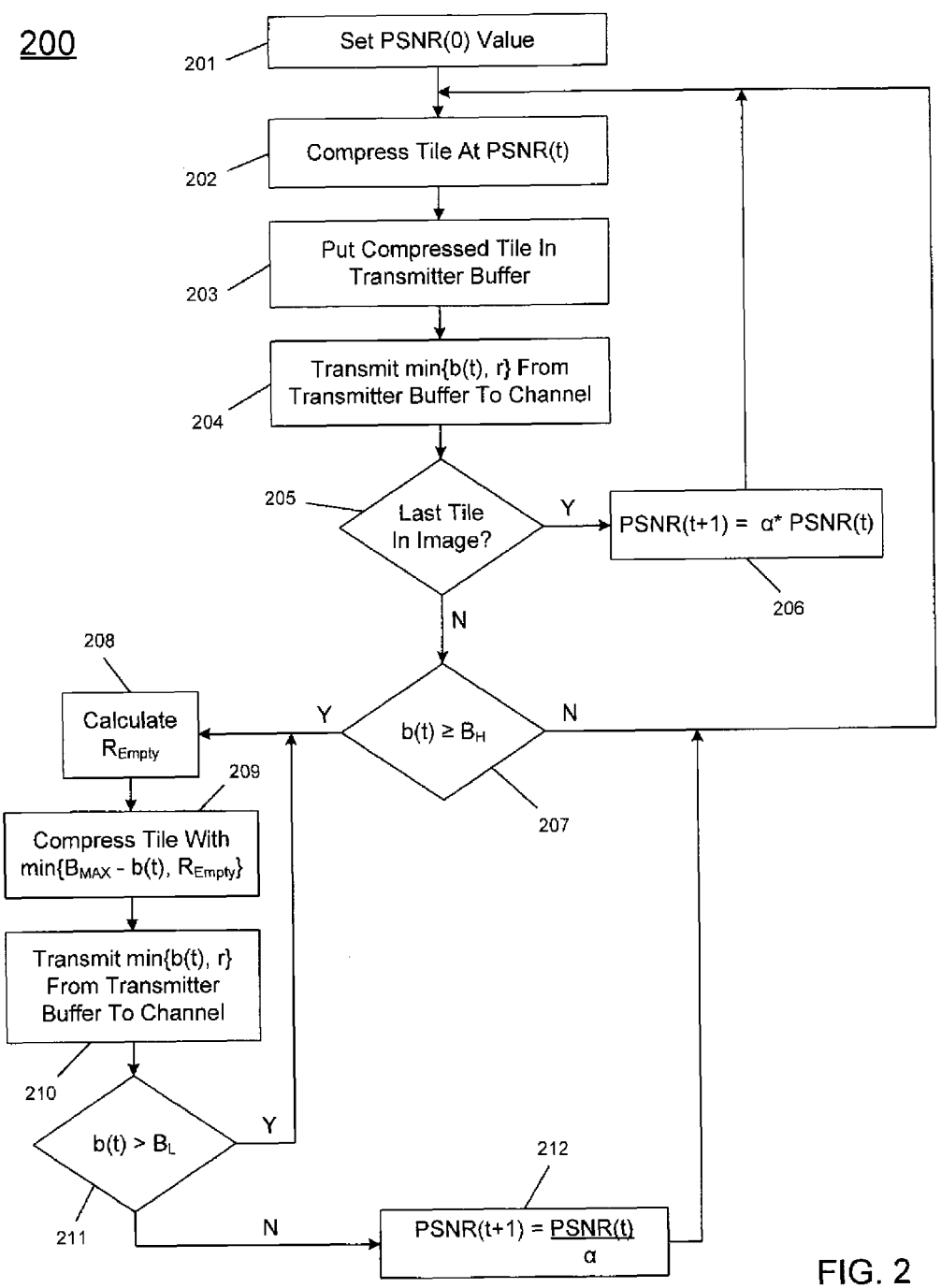
FIG. 2 is a flow chart in one embodiment of the invention.

FIG. 2 is a flow chart 200 in one embodiment of the invention. The method 200 may provide approximately equal visual quality for each decoded tile. Bit-size for each compressed tile may differ significantly. Transmitter buffer 106 (FIG. 1) may accumulate compressed tiles. Transmitter buffer 106 may have a limited bit-size. To avoid buffer overflow and to provide approximately equal visual quality for each decoded tile, various combinations of the following algorithms may be used in one embodiment of the invention. For the following embodiment of the invention, $B_{max}$ is transmitter buffer 106 size, $B_H$ is the high threshold of transmitter buffer 106 where $B_H < B_{max}$. Also, $B_L$ is the low threshold of transmitter buffer 106 where $B_L < B_H$. r is a constant channel bit rate and b(t) is the number of bits in transmitter buffer 106 at time t.

In block 201 of FIG. 2, an initial acceptable value of PSNR (t), where t=0, is set (e.g., PSNR(0)=50 dB). In block 202, encoder 104 may compress each tile at time t with quality PSNR(t). In block 203, the compressed tile may be put into transmitter buffer 106. In block 204, min{b(t),r} bits may be transmitted from transmitter buffer 106 to channel 111. In block 205, if this tile was the last tile in the image and b(t)=0, set PSNR(t+1)=α·PSNR(t) where α>1 (block 206) and return to block 202. If not, however, proceed to block 207. If b(t)≧$B_H$, then proceed to block 208. Otherwise, proceed to block 202.

In block 208, $R_{empty}$ may be calculated in, for example, controller 105, as follows:

$$R_{empty} = r - \max\left\{0, \frac{(b(t) - B_L)}{l}\right\}$$

where $R_{empty}$ is the number of bits per tile needed for transmitter buffer 106 to empty $B_L$ bits after l steps for a channel with throughput r.

In block 209, encoder 104 may compress each tile 101 at time t with min{$B_{max}$−b(t),$R_{empty}$} bits. In block 210, min{b(t),r} bits may be transmitted from transmitter buffer 106 to channel 111. If b(t)>$B_L$, proceed to 208. If not, go to block 212 and set $$PSNR(t+1) = \frac{PSNR(t)}{\alpha}.$$

Afterwards, proceed back to block 202.

Following is an example with the following conditions: $B_{max}$=30,000 bytes, $B_H$=20,000 bytes, $B_L$=10,000 bytes, PSNR(0)=50 dB, l=20, r=1,000 bytes, α=1.05, and b=0. R(t) is the number of bits for i-th tile if the tiles are compressed with PSNR(t). For example, R(1)=5000 if this tile is compressed with PSNR(1)=50 dB, R(2)=6000 if this tile is compressed with PSNR(2)=50 dB, R(3)=7000 if this tile is compressed with PSNR(3)=50 dB, R(4)=8000 if this tile is compressed with PSNR(4)=50 dB.

For 4-th tiles and t=1, in blocks 201, 202, the encoder 104 is compressing each tile 101 at time t with quality PSNR(1)= 50 dB. In block 203, a compressed tile is put into transmitter buffer 106. b(1)=b(0)+R(1)=5000. In block 204, min{b(t),r} bits are transmitted from transmitter buffer to channel. b(1)= b(1)−min(b(1),r)=5000−1000=4000. In block 205, if this was a last tile in image and b(t)=0, then set PSNR(t+1)=α·PSNR (t) (α>1). Assume a "false" condition. Then in block 207, if b(1)≧B$_H$ then go to block 208 (assume "false" condition), otherwise go to block 202 (assume "true" condition). At t=2, in blocks 201, 202 encoder 104 is compressing each tile at time t with quality PSNR(2)=50 dB. In block 203, the compressed tile is put into transmitter buffer 106. b(2)=b(1)+R(2)=4000+6000=10000. In block 204, min{b(t),r} bits are transmitted from the transmitter buffer to the channel. b(2)=b(2)−min(b(2),r)=10000−1000=9000. In block 205, if this was a last tile in image and b(t)=0, then set PSNR(t+1)=α·PSNR(t) (α>1) and go to block 202 (assume "false" condition). In block 207, if b(t)≧B$_H$, then go to block 208 (assume "false" condition), otherwise go to block 202 (assume "true" condition). At t=3, the encoder compresses each tile at time t with quality PSNR(3)=50 dB. The compressed tile is put into the transmitter buffer. b(3)=b(2)+R(3)=9000+7000=16000. In block 204, min{b(t),r} bits are transmitted from transmitter buffer to channel. b(3)=b(3)−min(b(3),r)=16000−1000=15000. In block 205, if this was a last tile in image and b(t)=0, then set PSNR(t+1)=α·PSNR(t) (α>1) and go to block 202 (assume "false" condition). In block 207, if b(t)≧B$_H$ then go to block 208 (assume "false" condition), otherwise go to block 202 (assume "true" condition). At t=4 in block 202, encoder 104 compresses each tile at time t with quality PSNR(4)=50 dB. The compressed tile is put into the transmitter buffer 106. b(4)=b(3)+R(4)=15000+8000=23000. In block 204, min{b(t), r} bits are transmitted from transmitter buffer to channel. b(4)=b(4)−min(b(4),r)=23000−1000=22000. In block 205, if this was a last tile in image and b(t)=0, then set PSNR(t+1)=α·PSNR(t) (α>1) and go to block 202. In block 207, if b(t)≧B$_H$, then go to block 208 (assume "true" condition), otherwise go to block 202.

For 2-th tiles, and t=5, in block 208 in, for example, the controller 105, calculate number of bits required for transmitter buffer emptying to be B$_L$ bits in l steps.

$$R_{empty} = r - \max\left\{0, \frac{(b(t) - B_L)}{l}\right\} = 1000 - \frac{22000 - 10000}{20} = 400$$

In block 209, encoder compresses each tile at time t with min{B$_{max}$−b(t),R$_{empty}$} bits b(5)=b(4)+R(5)=22000+400=22400. In block 210, min{b(t),r} bits are transmitted from transmitter buffer to channel. b(5)=b(5)−min(b(5),r)=22400−1000=21400. In block 211, if b(t)>B$_L$ go to block 208 (assume "true" condition), otherwise set $$PSNR(t+1) = \frac{PSNR(t)}{\alpha} \text{ and}$$

go to block 202 (assume "false" condition). At t=6, in block 208, calculate number of bits required for transmitter buffer emptying to be B$_L$ bits in l steps.

$$R_{empty} = r - \max\left\{0, \frac{(b(t) - B_L)}{l}\right\} = 1000 - \frac{21400 - 10000}{20} = 430$$

In block 209, encoder compresses each tile at time t with min{B$_{max}$−b(t),R$_{empty}$} bits b(6)=b(5)+R(6)=21400+430=21830. In block 210, min{b(t),r} bits are transmitted from transmitter buffer to channel b(6)=b(6)−min(b(6),r)=21830−1000=20830. In block 211, if b(t)>B$_L$, go to block 208 (assume "false" condition), otherwise set $$PSNR(t+1) = \frac{PSNR(t)}{\alpha}$$

and go to block 202 (assume "true" condition).

Thus, with f transmission buffer 106 of size B$_H$ and current channel rate r, various embodiments of the invention may re-allocate bits between tiles 101 to provide substantially equal and close to maximum visual quality for all or most tiles. As a result, all or most tiles may have acceptable visual quality. In one embodiment of the invention, transmission buffer 106 with size B$_H$ is 30 kB, 17:1 compression is used, which may lead to 50 dB PSNR for the reconstructed image 110.

In one embodiment of the invention, each tile has a constant PSNR for all or most practical channel rates.

Figure 3:
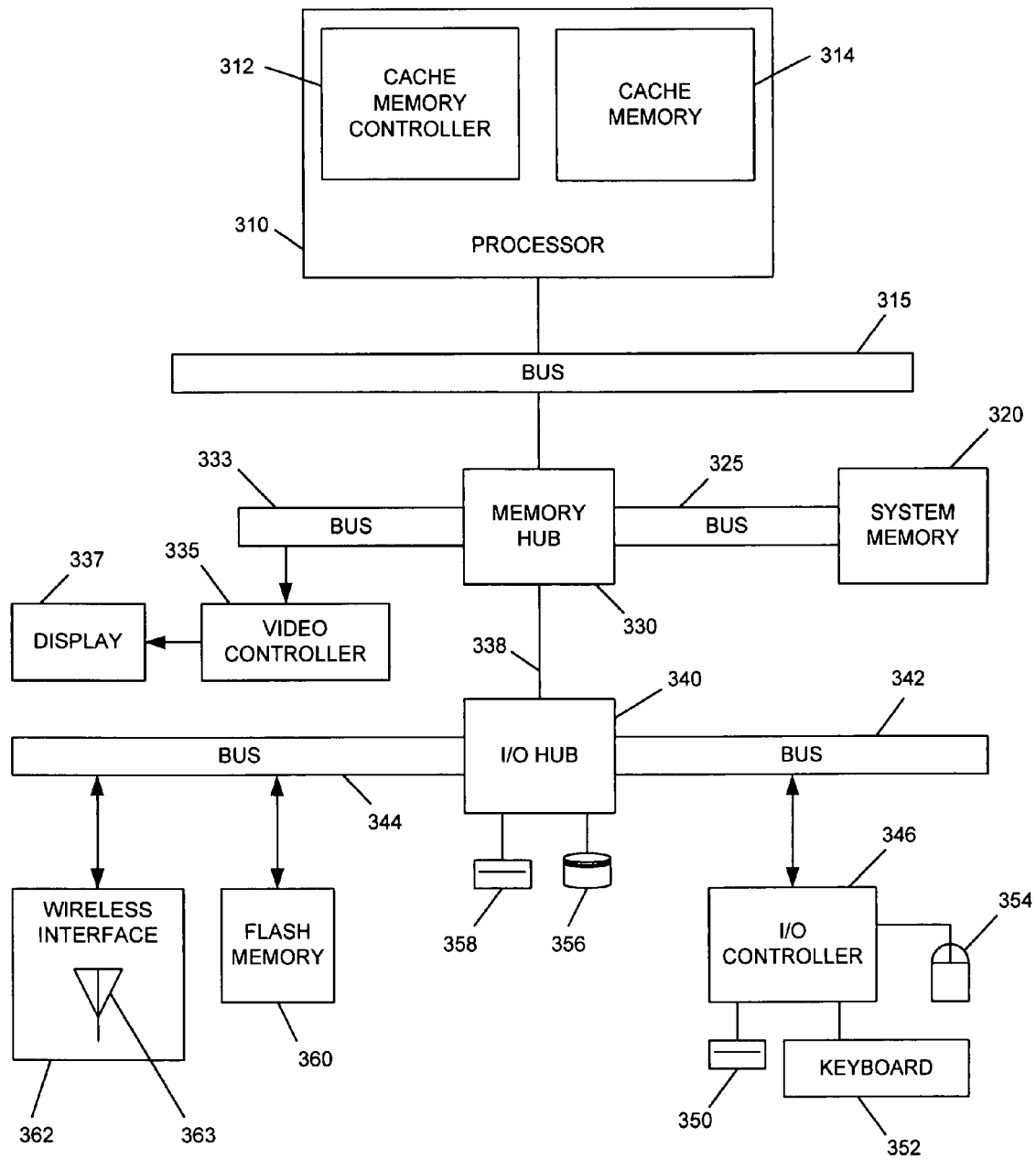
FIG. 3 is a block diagram of a system for use with one embodiment of the invention.

Now referring to FIG. 3, in one embodiment, computer system 300 includes a processor 310, which may include a general-purpose or special-purpose processor such as a microprocessor, microcontroller, a programmable gate array (PGA), and the like. Processor 310 may include a cache memory controller 312 and a cache memory 314. While shown as a single core, embodiments may include multiple cores and may further be a multiprocessor system including multiple processors 310. Processor 310 may be coupled over a host bus 315 to a memory hub 330 in one embodiment, which may be coupled to a system memory 320 (e.g., a dynamic RAM) via a memory bus 325. Memory hub 330 may also be coupled over an Advanced Graphics Port (AGP) bus 333 to a video controller 335, which may be coupled to a display 337.

Memory hub 330 may also be coupled (via a hub link 338) to an input/output (I/O) hub 340 that is coupled to an input/output (I/O) expansion bus 342 and a Peripheral Component Interconnect (PCI) bus 344, as defined by the PCI Local Bus Specification, Production Version, Revision 2.1 dated June 1995. I/O expansion bus 342 may be coupled to an I/O controller 346 that controls access to one or more I/O devices. These devices may include in one embodiment storage devices, such as a floppy disk drive 350 and input devices, such as a keyboard 352 and a mouse 354. I/O hub 340 may also be coupled to, for example, a hard disk drive 358 and a compact disc (CD) drive 356. It is to be understood that other storage media may also be included in the system.

PCI bus 344 may also be coupled to various components including, for example, a flash memory 360. A wireless interface 362 may be coupled to PCI bus 344, which may be used in certain embodiments to communicate wirelessly with remote devices. Wireless interface 362 may include a dipole or other antenna 363 (along with other components not shown). While such a wireless interface may vary in different embodiments, in certain embodiments the interface may be used to communicate via data packets with a wireless wide area network (WWAN), a wireless local area network (WLAN), a BLUETOOTH™, ultrawideband, a wireless personal area network (WPAN), or another wireless protocol. In various embodiments, wireless interface 362 may be coupled to system 300, which may be a notebook or other personal computer, a cellular phone, personal digital assistant (PDA) or the like, via an external add-in card or an embedded device. In other embodiments wireless interface 362 may be fully integrated into a chipset of system 300. In one embodiment of the invention, a network controller (not shown) may be coupled to a network port (not shown) and the PCI bus 344. Additional devices may be coupled to the I/O expansion bus 342 and the PCI bus 344. Although the description makes reference to specific components of system 300, it is contemplated that numerous modifications and variations of the described and illustrated embodiments may be possible.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    receiving digital video data into a transmitter buffer, the buffer having a maximum capacity and being coupled to a video data encoder and the video data including a first tile and a second tile;
    determining a first number of bits included in the buffer at a time (t) is greater than a first predetermined threshold that is less than the maximum capacity;
    compressing the first tile at a first compression bit size and the second tile at second compression bit size for transmission to a video data decoder; the first compression bit size being unequal to the second compression bit size; and
    basing the first compression bit size on determining the first number of bits is greater than the first predetermined threshold.

2. The method of claim 1, further comprising compressing the first tile and the second tile each at a peak signal-to-noise ratio (PSNR that is not based on a bit transfer rate to be used to transmit the first tile and the second tile to the video data decoder.

3. The method of claim 1, further comprising coupling the video data encoder to an antenna to wirelessly transmit the first tile and the second tile to the video data decoder.

4. The method of claim 1, further comprising compressing the first tile and the second tile so that each tile will have an equal visual display quality.

5. The method of claim 1, wherein the first tile and the second tile are both included in a single picture.

6. The method of claim 1, wherein the first tile and the second tile are both simultaneously included in the buffer.

7. An apparatus comprising:
    a transmitter memory to receive digital video data, the buffer to couple to a video data encoder and the video data to include a first tile and a second tile; and
    a processor, coupled to the buffer, to (a) determine a first number of bits included in the buffer at a time (t) is greater than a first predetermined threshold that is less than a maximum capacity of the buffer, (b) compress the first tile at a first compression bit size and the second tile at second compression bit size for transmission to a video data decoder; the first compression bit size to be unequal to the second compression bit size; (c) base the first compression bit size on determining the first number of bits is greater than the first predetermined threshold; and (d) compress the first tile and the second tile at generally equal peak signal-to-noise ratios (PSNR).

8. The apparatus of claim 7, wherein the processor is to compress the first tile and the second tile each at a PSNR that is not based on a bit transfer rate to be used to transmit the first tile and the second tile to the video data decoder.

9. The apparatus of claim 7, wherein the first compression bit size is to be based on a number of bits to be included in the memory at a time (t).

10. The apparatus of claim 7, wherein the memory is to couple between the video data encoder and the video data decoder, the memory to couple to the video data decoder via a wireless channel.

11. The apparatus of claim 7, wherein the processor is to wirelessly transmit the first tile and the second tile to the video data decoder each at a first bit transfer rate.

12. The apparatus of claim 7, wherein the processor is to compress the first tile and the second tile so that each tile will have an equal visual display quality.

13. An article comprising a non-transitory medium storing instructions that enable a processor-based system to:
    receive digital video data into a buffer, the buffer having a maximum capacity and being coupled to a video data encoder and the video data including a first tile and a second tile;
    determine a first number of bits included in the buffer at a time (t) is greater than a first predetermined threshold that is less than the maximum capacity;
    compress the first tile at a first compression bit size and the second tile at second compression bit size for transmission to a video data decoder; the first compression bit size being unequal to the second compression bit size; and
    base the first compression bit size on determining the first number of bits is greater than the first predetermined threshold.

14. The article of claim 13 storing instructions that enable the system to:
    determine a second number of bits needed to reduce the first number of bits included in the buffer at time (t) to below a second predetermined threshold in a predetermined number of steps; and
    base the first compression bit size on the determined second number of bits.

15. The article of claim 14 storing instructions that enable the system to:
    affirmatively determine the first tile is not the last tile in an image to be compressed; and
    base the first compression bit size on affirmatively determining the first tile is not the last tile in the image to be compressed.

16. The article of claim 13 storing instructions that enable the system to:
    affirmatively determine the first tile is not the last tile in an image to be compressed; and
    base the first compression bit size on affirmatively determining the first tile is not the last tile in an image to be compressed.

17. The article of claim 13 storing instructions that enable the system to:
    affirmatively determine the first tile is the last tile in an image to be compressed; and
    compress the first tile at a first peak signal-to-noise ratio (PSNR) and the second tile at a second PSNR;

wherein the first PSNR is greater than the second PSNR based on determining the first tile is the last tile in an image to be compressed.

18. The article of claim 13 storing instructions that enable the system to:
   affirmatively determine the first tile is the last tile in an image to be compressed; and
   compress the first tile at a first peak signal-to-noise ratios (PSNR) and the second tile at second PSNR;
   wherein the first PSNR is less than the second PSNR based on determining a number of bits included in the buffer at a point in time is greater than a predetermined low storage threshold for the buffer.

19. The article of claim 13 wherein the first predetermined threshold includes a static value predetermined and existing between 0 and the maximum capacity.

20. The article of claim 13 storing instructions that enable the system to compress the first tile and the second tile at equal peak signal-to-noise ratios (PSNR).

* * * * *

UNITED STATES PATENT AND TRADEMARK OFFICE
CERTIFICATE OF CORRECTION

| | | |
|---|---|---|
| PATENT NO. | : 8,279,935 B2 | Page 1 of 1 |
| APPLICATION NO. | : 11/904389 | |
| DATED | : October 2, 2012 | |
| INVENTOR(S) | : Eugeniy Belyaev and Andrey Turlikov | |

It is certified that error appears in the above-identified patent and that said Letters Patent is hereby corrected as shown below:

Col. 5:
Line 58, "memory" should be --buffer--.

Signed and Sealed this
Fourth Day of December, 2012

David J. Kappos
*Director of the United States Patent and Trademark Office*